Patented Mar. 26, 1940

2,195,194

UNITED STATES PATENT OFFICE 2,195,194

TREATMENT OF FIBROUS MATERIALS

Heinrich Ulrich, Karlhugo Kuespert, and Jens Sattler, Ludwigshafen-on-the-Rhine, Germany, assignors to I. G. Farbenindustrie Aktiengesellschaft, Frankfort-on-the-Main, Germany No Drawing. Application May 12, 1939, Serial No. 273,360. In Germany May 13, 1938

7 Claims. (Cl. 28—1)

The present invention relates to a process of improving fibrous materials by treating them with high-molecular hydroxyalkylamines or ethers thereof.

It has been proposed in the treatment of vegetable, animal or other materials to use as assistants low molecular aliphatic or mixed aliphatic-hydroaromatic ammonia derivatives containing one or more hydroxyalkyl or hydroxycycloalkyl groups, or the ethers or hydroxyethers of these compounds.

We have now found that hydroxyalkylamines of the general formula:

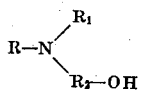

or the salts or quaternary ammonium compounds derived therefrom (in which R is an aliphatic hydrocarbon radicle containing at least eight carbon atoms, $R_1$ is an aliphatic, cycloaliphatic, aromatic or a mixed aliphatic-aromatic radicle and $R_2$ is an aliphatic radicle the chain of which may be interrupted by oxygen atoms) are eminently suitable for improving fibrous materials. Compounds of the said kind are for example those containing in the molecule high-molecular weight aliphatic radicles, such as octyl, decyl, dodecyl, tetradecyl, cetyl, octodecyl, octodecenyl, chloroctodecyl, montanyl or still higher radicles. Compounds in which R and $R_1$ are high molecular weight radicles for example such containing from 8 to 18 carbon atoms of the said kind are especially active. Particularly suitable are compounds of the said kind containing high molecular aliphatic radicles derived from fatty acids of vegetal origin. $R_1$ may also be a cyclohexyl, benzyl, phenyl or naphthyl radicle or a hydroxyalkyl, aminoalkyl, alkylaminoalkyl or chloralkyl radicle or an ether, polyether, hydroxyether or alkylcarboxylic acid radicle. In the quaternary ammonium compounds derived from the said amines the fourth valency of the nitrogen atom is linked to an aliphatic, cycloaliphatic, aromatic or mixed aliphatic aromatic radicle; the fifth valency of the nitrogen atom may be linked to a hydroxyl group or to an anion such as halogen.

$R_2$ may be for example a methylene, ethylene, propylene or butylene radicle or also an alkylglycol ether radicle which may contain different alkylene radicles. Such compounds are obtained for example by the action of 1 or more molecular proportions of ethylene oxide on secondary amines of the formula:

or on tertiary amines of the formula

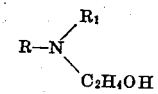

in which R and $R_1$ represent the above-mentioned radicles. Especially suitable compounds are for example dicetyl- or dioctodecyl-ethanolaminomono- or di-ethylene glycol ethers or octodecyl-diethanolamino-mono glycol ethers and similar compounds. The said compounds may for example be prepared by causing one or two molecular proportions of ethylene oxide to react with one molecular proportion of one of the said amines. However compounds very suitable for the improvement of fibrous materials can be obtained by causing larger amounts of ethylene oxide, for example from 10 to 20 molecular proportions of alkylene oxide to one molecular proportion of one of the said amines. For the preparation of the said ether compounds also other alkylene oxides than ethylene oxide, such as propylene oxide glycide or epichlorhydrin may be employed. The quaternary ammonium compounds of the said kind may be obtained by reacting the amines described above with alkylating agents and as alkylhalides or dimethylsulphate.

The said compounds are eminently suitable for oiling wool, for softening cotton, artificial silk and staple fibre and in particular for loosening the sticking together of freshly prepared artificial silk threads or staple fibre and at the same time imparting to the goods a full and open touch.

The treatment of the fibrous materials is effected with aqueous solutions or dispersions of the said compounds or their salts, as for example the hydrochlorides, sulphates, formates, acetates or lactates, or of their quaternary ammonium compounds, at ordinary or slightly elevated temperature, as for example between 40° and 80° C. for a short time, as for example one quarter to one half of an hour. Generally speaking the treatment baths may contain per liter about 0.5 to 10 grams of the said compounds, although often baths having a content of from 0.5 to 2 grams per liter of water are sufficient. After this treatment the fibrous material are hydroextracted, rinsed and dried.

The following examples will further illustrate how the said invention may be carried out in practice but the invention is not restricted to these examples.

*Example 1*

Staple fibre is treated for one quarter of an hour at from 60° to 80° C. in a bath containing per liter of water 5 grams of a mixture of dicetyl- and dioctodecyl-ethanolamine polyethylene glycol ether (obtainable by the action of 3 molecular proportions of ethylene oxide on about 1 molecular proportion of a technical mixture of dicetylamine and dioctodecylamine) and then hydroextracted and rinsed. The staple fibre has a full, soft and open touch.

A good effect is also obtained with the reaction product of 2 molecular proportions of ethylene oxide on 1 molecular proportion of a mixture of mono- and di-octodecylmonoethanolamine. Also reaction products of 10 or more molecular proportions of ethylene oxide on 1 molecular proportion of the said mixture of amines may be advantageously employed.

*Example 2*

Worsted is treated for about 20 minutes at ordinary temperature with a solution containing per liter of water 3 grams of octodecyl-diethanolamine monoglycol ether. The worsted is thus well oiled. The oil can readily be removed again by thorough rinsing with water.

The action may be further enhanced by adding to the solution emulsifying agents or other textile assistants, as for example an alkylated aromatic sulphonic acid or an acid sulphuric ester or a true sulphonic acid of a high molecular weight aliphatic compound, such as reaction products of high molecular fatty acids with hydroxyalkyl- or aminoalkylsulphonic acids.

What we claim is:

1. The process of improving fibrous material which comprises treating the fibrous material with a compound selected from the class consisting of amines of the general formula

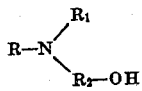

their salts and their quaternary ammonium compounds in which formula R represents an aliphatic hydrocarbon radicle containing at least eight carbon atoms, $R_1$ a radicle selected from the class consisting of aliphatic, cycloaliphatic, aromatic and mixed aliphatic-aromatic radicles and $R_2$ an aliphatic radicle.

2. The process of improving fibrous material which comprises treating the fibrous material with a compound selected from the class consisting of amines of the general formula

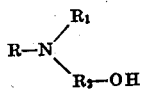

their salts and their quaternary ammonium compounds, in which formula R represents an aliphatic hydrocarbon radicle containing at least eight carbon atoms, $R_1$ a radicle selected from the class consisting of aliphatic, cycloaliphatic, aromatic and mixed aliphatic-aromatic radicles and $R_2$ is an aliphatic radicle, the chain of which is interrupted by oxygen atoms.

3. The process of improving fibrous material, which comprises treating the fibrous material with a compound selected from the class consisting of amines of the general formula

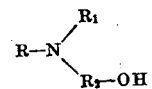

their salts and their quaternary ammonium compounds, in which formula R represents an aliphatic hydrocarbon radicle containing from 8 to 18 carbon atoms, $R_1$ a radicle selected from the class consisting of aliphatic, cycloaliphatic, aromatic and mixed aliphatic-aromatic radicles and $R_2$ an aliphatic radicle.

4. The process of improving fibrous material which comprises treating the fibrous material with a compound selected from the class consisting of amines of the general formula

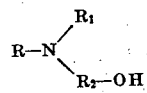

their salts and their quaternary ammonium compounds, in which formula R represents an aliphatic hydrocarbon radicle containing at least eight carbon atoms, $R_1$ a radicle selected from the class consisting of aliphatic, cycloaliphatic, aromatic and mixed aliphatic-aromatic radicles and $R_2$ a polyalkylene ether radicle.

5. The process of softening fibrous materials which comprises treating the fibrous material with a compound selected from the class consisting of amines of the general formula

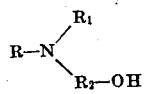

their salts and their quaternary ammonium compounds in which formula R represents an aliphatic hydrocarbon radicle containing at least eight carbon atoms, $R_1$ a radicle selected from the class consisting of aliphatic, cycloaliphatic, aromatic and mixed aliphatic-aromatic radicles and $R_2$ an aliphatic radicle.

6. The process of loosening freshly prepared artificial silk threads with a compound selected from the class consisting of amines of the general formula

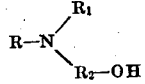

their salts and their quaternary ammonium compounds in which formula R represents an aliphatic hydrocarbon radicle containing at least eight carbon atoms, $R_1$ a radicle selected from the class consisting of aliphatic, cycloaliphatic, aromatic and mixed aliphatic-aromatic radicles, and $R_2$ an aliphatic radicle.

7. Fibrous materials treated with and containing a compound selected from the class consisting of amines of the general formula

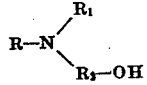

their salts and their quaternary ammonium compounds, in which formula R represents an aliphatic hydrocarbon radicle containing at least eight carbon atoms, $R_1$ a radicle selected from the class consisting of aliphatic, cycloaliphatic, aromatic and mixed aliphatic-aromatic radicles, and $R_2$ an aliphatic radicle.

HEINRICH ULRICH.
KARLHUGO KUESPERT.
JENS SATTLER.